(No Model.)
L. STIERINGER.
STAPLE FOR ELECTRICAL CONDUCTORS.
No. 420,635. Patented Feb. 4, 1890.
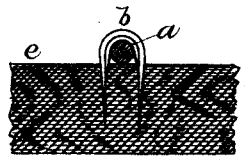
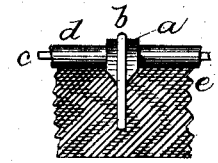
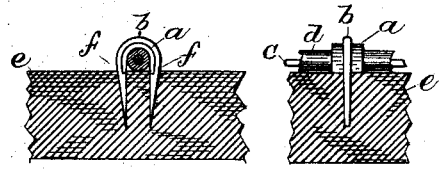
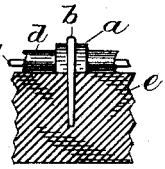
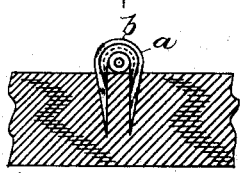
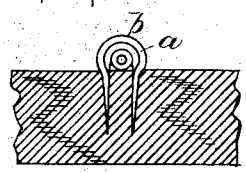
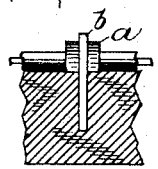
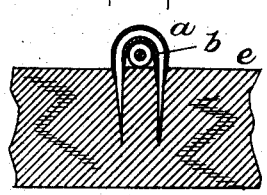
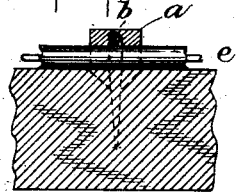
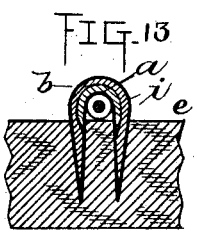
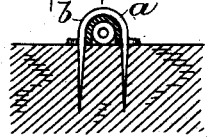
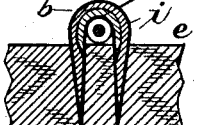
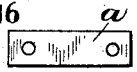
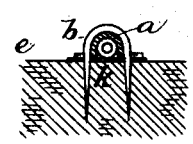
Witnesses
Inventor
Luther Stieringer
By his Attorneys
Dyer & Seely

UNITED STATES PATENT OFFICE.

LUTHER STIERINGER, OF NEW YORK, N. Y.

STAPLE FOR ELECTRICAL CONDUCTORS.

SPECIFICATION forming part of Letters Patent No. 420,635, dated February 4, 1890.

Application filed August 26, 1889. Serial No. 321,958. (No model.)

*To all whom it may concern:*

Be it known that I, LUTHER STIERINGER, a citizen of the United States, residing at New York city, in the county and State of New York, have invented a certain new and useful Improvement in Staples, of which the following is a specification.

Heretofore in the wiring of buildings and other structures for electric lighting and other purposes where the wires are run along the wall or other surface it has been customary to employ for securing the wire to such surface double-pointed metal staples, which are driven in over the wires, so that their curved heads fit upon the wire and hold the same in place. With this arrangement difficulty has arisen because the metal of the staple is liable to come into contact with the wire, sometimes by the abrasion of the insulating-covering of the wire by the staple, and also when the insulation becomes deteriorated in use by exposure or otherwise. Such contact of the metal staple with the wire is likely to result in leakage and ground connections.

The object of my invention is to so form and construct staples for the purpose above mentioned that the metal of which they are made cannot at any time come in contact with the wire, and which staples can without injury be readily driven, and will make their own holes like an ordinary metal staple. I accomplish this by constructing an open-sided metal staple with a saddle of insulating material attached to the staple in such manner as to come under its head, and therefore when the staple is in place to be interposed between said head and the wire, such saddle being so effectively secured to the staple that it will not be detached therefrom in driving the staple and will remain a permanent part of the staple while in use. I make the saddle sufficiently wide to give a good bearing-surface on the wire and to prevent any abrasion of the wire. The said saddle may be secured to the staple in many different ways—such as by a suitable cement, by forming the staple or saddle with engaging projections for holding the same, and in other ways—some of which are hereinafter described. I prefer in addition to cover the whole of the staple and saddle with a coating of japan, which preserves the metal from oxidation where exposed, prevents the material of the saddle from absorbing moisture, and also helps to secure the insulating-saddle to the staple.

My invention is illustrated in the accompanying drawings.

Figures 1 and 2 are front and side elevations showing a form of my invention in which the saddle is merely cemented to the staple. Figs. 3 and 4 show another form in which the saddle is held by internal projections on the staple. Figs. 5 and 6 illustrate still another form in which the parts are united by means of a groove in the top of the saddle. Figs. 7 and 8 show a form in which the staple is bent around the saddle. Figs. 9 to 12 illustrate a modification in which the staple is passed through a hole in the saddle, Fig. 9 being a vertical transverse section, Fig. 10 a top view before the staple is bent, Fig. 11 a cross-section of Fig. 10, and Fig. 12 a vertical section of the staple on a plane at right angles to that of Fig. 9. Fig. 13 illustrates a staple covered with japan. Fig. 14 shows still another mode of securing the saddle to the staple, and Figs. 15 and 16 illustrate the manner of making this form. Fig. 17 shows a modified way of using the staple.

In all cases the saddle $a$ is made of a suitable insulating material—such as wood or vulcanized or gelatinized fiber—and the staple $b$ is made of a suitable metal, and is, like the ordinary metal staple, open on one side, so as to be adapted to be driven over the wire into the backing of wood or other material to which the wire is to be secured without previously making incisions.

In Figs. 1 and 2 the saddle $a$, which is bent or otherwise formed into the shape shown, is secured beneath the head of the staple by means of a suitable glue or cement applied between the saddle and the staple. The saddle is preferably formed, as shown, with sharply-tapering extremities, which enter the holes formed in driving the staples in, so as to completely surround the wire and prevent any possibility of its coming in contact with the metal of the staple. The wire $c$ is covered with the usual coating of insulating material $d$, and being laid upon the wall or other surface e a suitable number of the staples b, provided with the insulating-saddles a, are driven in over the wire and hold the same in place.

In the form shown in Figs. 3 and 4 the staple b is formed with internal shoulders or projections at f and the curved saddle a is held between such shoulders and the curved head. If desired, the saddle may be additionally secured by means of cement or glue. The shoulders f are preferably situated a sufficient distance from the head of the staple to cause the extremities of the saddle to enter beneath the surface e, so as to entirely protect the wire.

In Figs. 5 and 6 the curved saddle is provided on its outer side with a groove g, in which the staple fits, and in which it may be secured, as before, by suitable cement or otherwise.

In Figs. 7 and 8 the staple is formed of suitable metal and its head is bent around the saddle a to hold the same, the securing-cement being added, if desired.

In the form shown in Figs. 9 to 12 the saddle is first formed as a straight block of material which can be bent—such as a suitable wood or prepared fiber—and with an aperture extending through it at h. Through this aperture is passed the staple, which is then in a straight form, as shown in Fig. 10, the sharp ends of the staple projecting from the extremities of the saddle. The whole is then bent into the form indicated in Figs. 9 and 12 and driven over the wire in the manner already described.

Figs. 15 and 16 show the saddle formed originally as a rectangular piece slotted at its ends, as in Fig. 15, or perforated near the ends, as in Fig. 16. The staple is forced over this, with its ends passing through the slots or perforations, and the saddle bends under the head of the staple, the resulting structure being as shown in Fig. 14, with the ends of the saddle extending out at the sides of the staple.

As shown in Fig. 17, I may place under the wire a strip or block k, of suitable insulating material, through which the staple passes and by means of which the wire is completely encircled by external insulation. The strip or block k also raises the wire off of the surface e, any desired elevation being obtained by increasing the thickness of the strip or block.

It will be seen that in all the forms of my invention the saddle forms a wide insulating-surface secured beneath the head of the metal staple, such surface coming in contact with the insulation, preventing the abrasion of the same by the staple, and preventing the staple from ever coming in contact with the wire. In some cases I prefer to immerse the whole structure in a bath of japan, so as provide it with a coating of that material. This is illustrated in Fig. 13, which shows the form of my invention illustrated in Figs. 5 and 6, although it is evident that the japan coating is as readily applicable to the other forms illustrated.

The heavy black line i indicates the coating of japan varnish which covers the surfaces of the staple and the insulating-saddle, protecting them from moisture and assisting in securing the parts together.

In Patent No. 317,879 staples are described made entirely of an insulating material; but, while such staples avoid the difficulties arising from the use of metal staples, they have proved expensive to manufacture, cannot be readily driven, and require that incisions should be previously made in the backing, especially when such backing is of a hard wood. The desideratum which my present invention supplies is a staple which will possess the advantages of the staple of said patent and can be driven like an ordinary metal staple.

What I claim is—

1. As a new article of manufacture, an open-sided metal staple adapted to be driven and provided with a saddle of insulating material secured thereto, so as to present a body of insulation between the metal head of the staple and the wire, substantially as set forth.

2. An open-sided metal staple having internal shoulders on its sides and in combination therewith a saddle of insulating material held between such shoulders and under the head of the staple, substantially as set forth.

3. The combination, with an open-sided metal staple, of a saddle of insulating material secured to such staple beneath its head and having tapering extremities adapted to enter the holes formed by the staple in driving, substantially as set forth.

4. The combination, with an open-sided metal staple, of a saddle of insulating material secured to such staple beneath its head and a coating of moisture-proof material placed over said staple and saddle, substantially as set forth.

This specification signed and witnessed this 20th day of August, 1889.

LUTHER STIERINGER.

Witnesses:
WILLIAM PELZER,
D. H. DRISCOLL.